United States Patent
Van Gundy

(10) Patent No.: US 7,379,540 B1
(45) Date of Patent: May 27, 2008

(54) SERVER WITH BACKUP CAPABILITY FOR DISTRIBUTED IP TELEPHONY SYSTEMS

(75) Inventor: Scott A. Van Gundy, Los Gatos, CA (US)

(73) Assignee: Shortel, Inc., Sunnyvale, CA (US)

( * ) Notice: Subject to any disclaimer, the term of this patent is extended or adjusted under 35 U.S.C. 154(b) by 560 days.

(21) Appl. No.: 10/671,269

(22) Filed: Sep. 24, 2003

(51) Int. Cl.
*H04M 11/00* (2006.01)

(52) U.S. Cl. .................. 379/88.18; 379/88.25

(58) Field of Classification Search .......... 379/88.18, 379/88.22, 88.14, 88.25
See application file for complete search history.

(56) References Cited

U.S. PATENT DOCUMENTS

| | | | | |
|---|---|---|---|---|
| 5,572,578 A | * | 11/1996 | Lin et al. .................. | 379/88.18 |
| 5,687,220 A | * | 11/1997 | Finnigan .................. | 379/88.22 |
| 5,781,615 A | * | 7/1998 | Bales et al. .............. | 379/88.18 |
| 5,903,627 A | * | 5/1999 | Shaffer et al. ............ | 379/67.1 |
| 5,909,483 A | * | 6/1999 | Weare et al. ............. | 379/88.18 |
| 5,995,596 A | * | 11/1999 | Shaffer et al. ........... | 379/88.18 |
| 6,002,751 A | * | 12/1999 | Shaffer ..................... | 379/88.18 |
| 6,069,890 A | * | 5/2000 | White et al. ............... | 370/352 |
| 6,396,908 B1 | * | 5/2002 | O'Donovan et al. ..... | 379/88.18 |
| 2004/0146147 A1 | * | 7/2004 | Picard et al. ............. | 379/88.22 |
| 2005/0111635 A1 | * | 5/2005 | Caputo et al. ............ | 379/88.22 |

\* cited by examiner

*Primary Examiner*—Fan Tsang
*Assistant Examiner*—Simon Sing
(74) *Attorney, Agent, or Firm*—Fenwick & West LLP

(57) ABSTRACT

A system for providing voice mail backup on a secondary server including two or more distributed voice mail servers. Each distributed voice mail server includes a telephony management software (TMS) unit, a telephony application programming interface (TAPI) unit, and an application unit. The application unit includes a voice mail control module, a call status module, a call transfer module, a voice mail migration module, a storage module, an audio encoding/ decoding module, a configuration module, an extension library module, and a telephony application programming interface (TAPI) interface module. Each server is capable of storing a voice message for an extension serviced by a remote server if the remote server is unavailable.

4 Claims, 4 Drawing Sheets

SERVER WITH BACKUP CAPABILITY FOR DISTRIBUTED IP TELEPHONY SYSTEMS

CROSS-REFERENCE TO RELATED APPLICATIONS

The present invention relates to U.S. patent application Ser. No. 10/754,424, entitled "Distributed Session-Based Data" filed on Jan. 8, 2004.

TECHNICAL FIELD

This invention relates generally to distributed telephony, and more particularly, to fault-tolerant servers for distributed IP telephony systems.

BACKGROUND

Enterprises often have several offices or call centers that are located in a plurality of locations. To interconnect all of these sites, enterprise telephony systems have been developed. Enterprise telephony systems consist of a distributed set of voice switches. This distributed hardware platform enables increased reliability and system capacity. Enterprise telephony systems also offer enterprise applications enabled by the integration of computer systems with telephony services. Voice mail is one example of such enterprise applications.

While the underlying hardware in enterprise telephony systems is distributed, the software that supports the computer-integrated functionality is typically centralized. The software is generally implemented as a client-server environment in which the participants or clients (distributed telephony users) communicate directly with the server. For example, a client may create a voice mail that is meant to be stored on a primary server. Centralized computer-integrated features rely not only on a central server's application platform but also on the availability of the network that connects the switches, central server, and application services.

A centralized approach to providing computer-integrated features or functionality has a number of limitations. One problem is that centralized systems have very limited scalability. As more sites are added to an enterprise telephony system, the demand on the central server or logical cluster increases. In order to meet this increased demand, the central server must be upgraded regularly. While upgrading servers can be expensive, the alternative is far worse. If the server is not upgraded, users of the telephony system will experience severely decreased levels of service due to bottlenecks at the server and other problems.

Another problem with centralized systems is that they lack resilience. Computer-integrated features need to be fault tolerant and highly available. When these features rely on a central server, however, they are affected whenever the central server experiences a problem. One possible solution is to use both a primary server and a backup server. When the primary server is working correctly, it handles all incoming requests. The backup server is used only when the primary server confronts a network outage or computing problem. In other words, the backup server is used for failover redundancy. While this configuration is better than one containing a central server alone, recovery of voice mail during a failover transition can still be challenging. If the primary server failed while a user was trying to create a voice mail that was meant to be stored on the primary server, the backup server may not be able to capture the voice mail accurately.

What is needed is a system and method for providing computer-integrated functionality that provides high reliability and high availability to a plurality of participants. What is further needed is a system and method that uses peer-to-peer interactions to achieve this goal.

SUMMARY OF THE INVENTION

Computer-integrated functionality is implemented using a plurality of servers in a distributed telephony environment. Each site is communicatively coupled to every other site via a network. Each site is also connected to the public switched telephone network (PSTN). In one embodiment, a site includes an edge router, two switches, and a server. In another embodiment, a site includes only an edge router and two switches.

At least one site includes a server. The server includes a telephony management software (TMS) unit, a telephony application programming interface (TAPI) unit, and a computer-integrated functionality unit. The server is coupled to the network and to a storage device.

If the destination server for a computer-integrated function is unavailable, a different server will handle the request. When the destination server becomes available again, the necessary data will be automatically forwarded to the destination server. A network proxy that determines the network status implements this fault tolerance.

Further features of the invention, its nature, and various advantages will be more apparent from the accompanying drawings and the following detailed description.

BRIEF DESCRIPTION OF THE DRAWINGS

The accompanying drawings illustrate several embodiments of the invention and, together with the description, serve to explain the principles of the invention.

DETAILED DESCRIPTION OF THE EMBODIMENTS

The present invention is now described more fully with reference to the accompanying figures, in which several embodiments of the invention are shown. The present invention may be embodied in many different forms and should not be construed as limited to the embodiments set forth herein. Rather, these embodiments are provided so that this disclosure will be thorough and complete and will fully convey the invention to those skilled in the art.

One skilled in the art will recognize that methods, apparatus, systems, data structures, and computer readable media implement the features, functionalities, or modes of usage described herein. For instance, an apparatus embodiment can perform the corresponding steps or acts of a method embodiment.

A. System Architecture

Figure 1:
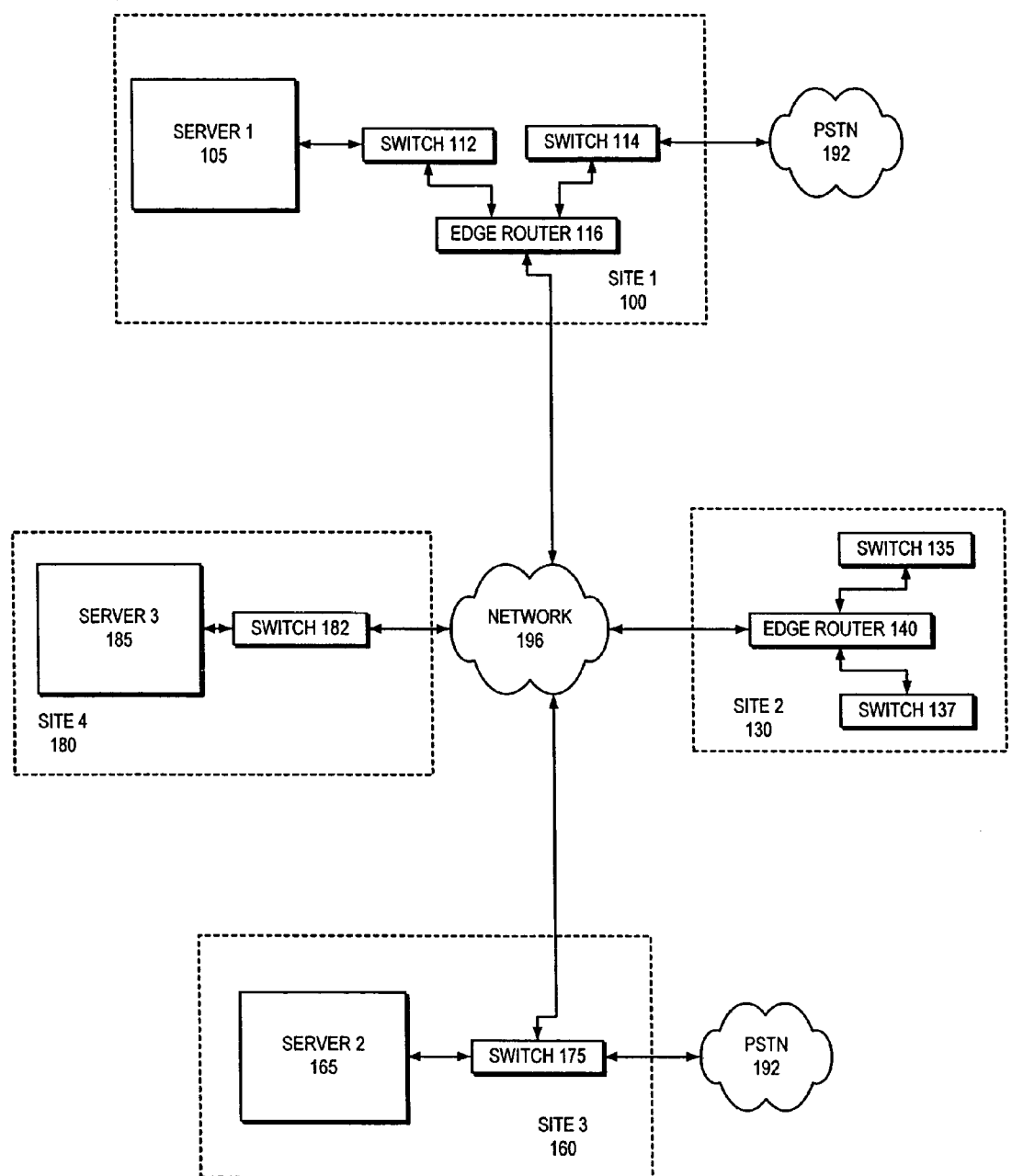
FIG. 1 is an illustration of an exemplary distributed telephony system architecture according to one embodiment of the present invention having four sites.

FIG. 1 is an illustration of a distributed telephony system architecture according to one embodiment of the present invention having four sites. The illustrated embodiment includes a first site 100, a second site 130, a third site 160, and a fourth site 180. As used herein, a site represents a grouping of resources. In the illustrated embodiment, each of the four sites 100, 130, 160, 180 is communicatively coupled via a network 196. One skilled in the art will note that sites 100, 130, 160, 180 can be physically distinct from each other or merely topology-related groupings that are not in physically distinct locations. The system architecture in FIG. 1 is used only by way of example. While FIG. 1 illustrates four sites, the present invention applies to any system architecture containing two or more sites.

The first site 100 includes an edge router 116, a first switch 112, a second switch 114, and a first server 105. The edge router 116 couples the first site 100 to the network 196 and provides local area connectivity for the first and second switches 112, 114. The first and second switches 112, 114 represent voice over Internet protocol (VoIP) devices to which a number of endpoints (e.g., telephone devices) can be coupled. Further, the second switch 114 provides connectivity to the public switched telephone network (PSTN) 192 via an analog or digital trunk line (e.g., a T1 or E1 interface). In the illustrated configuration, the second switch 114 provides an interface for calls originating from or terminating on the PSTN 192. One skilled in the art will recognize that numerous configurations of switches and communications links are contemplated. For example, PSTN links can be coupled to multiple switches at several points within the topology and softswitches can also be used.

The second site 130 similarly includes a first switch 135, a second switch 137, and an edge router 140 to which the first and second switches 135, 137 are communicatively coupled. The edge router 140 is further coupled to the network 196 to provide the first and second switches 135, 137 connectivity to the other sites 100, 160, 180. Although, for convenience of illustration, the exemplary system architecture of FIG. 1 does not include endpoints, one skilled in the art will recognize that each of the first and second switches 135, 137 is capable of having a number of endpoints communicatively coupled thereto.

The configuration of the second site 130 demonstrates that a server is not required for each site. Although embodiments of the present invention exchange data between servers, the first and second switches 135, 137 of the second site 130 can be managed by the first server 105 that is illustrated in the first site 100. A call can involve more than one switch. For example, a call that originates from the PSTN 192 and terminates on an endpoint that is communicatively coupled to first switch 135 of the second site 130 involves two switches: the second switch 114 of the first site 100 and the first switch 135 of the second site 130. In addition, each switch can be managed by a different server.

The third site 160 similarly includes a switch 175 and a second server 165. The switch 175 is communicatively coupled to the PSTN 192 in a manner that is similar to the second switch 114 of the first site 100. By being coupled to the PSTN 192, the switch 175 provides additional capability for endpoints to receive calls from or terminate calls on the PSTN 192. The switch 175 is also coupled to the network 196 to communicate with the other sites 100, 130, 180.

The fourth site 180 includes a switch 182 and a third server 185. Similar to the third site 160, the fourth site 180 includes a single switch 182 and, therefore, does not need an edge router to provide connectivity to the network 196. One skilled in the art will appreciate that additional networking devices can be added to the fourth site 180, for example, if needed to support additional endpoints, servers, or other systems.

In one embodiment of the present invention, the network 196 is a partially public or a wholly public network such as the Internet. The network 196 can also be a private network or include one or more distinct or logical private networks (e.g., virtual private networks or wide area networks). Additionally, the communication links to and from the network 196 can be wireline or wireless (i.e., terrestrial- or satellite-based transceivers). In one embodiment of the present invention, the network 196 is an IP-based wide or metropolitan area network.

B. Server Architecture

Figure 2:
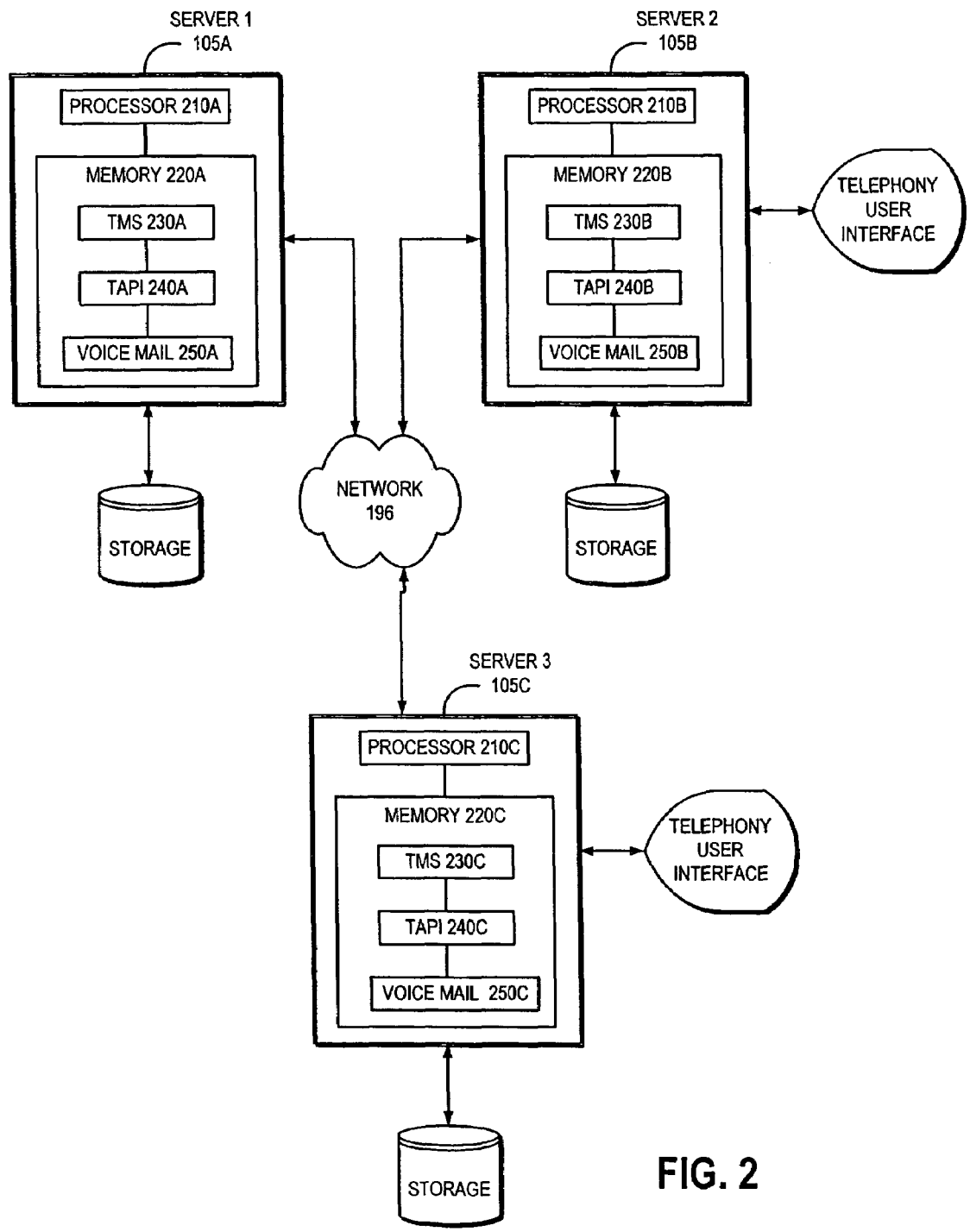
FIG. 2 is a diagram illustrating an exemplary server architecture according to one embodiment of the present invention having three servers.

FIG. 2 is a diagram illustrating server architecture according to one embodiment of the present invention having three servers. In this embodiment, three servers 105A, 105B, 105C are configured to implement features or functions of the present invention. Each server 105A, 105B, 105C includes a processor 210A, 210B, 210C, respectively. The processor 210A, 210B, 210C can be a conventional processing device, such as a general-purpose microprocessor.

Each server also includes a memory 220A, 220B, 220C. The memory 220A, 220B, 220C includes program instructions or functional units that implement features of the present invention. Specifically, the memory 220A, 220B, 220C includes a telephony management software (TMS) unit 230A, 230B, 230C and a telephony application programming interface (TAPI) unit 240A, 240B, 240C, respectively.

In one embodiment, the memory 220A, 220B, 220C also includes one or more application units that interact with the TMS unit 230A, 230B, 230C and the TAPI unit 240A, 240B, 240C to enable a specific computer-integrated function. An application unit uses the TAPI unit 240A, 240B, 240C to exchange data with the TMS unit 230A, 230B, 230C. The TMS unit 230A, 230B, 230C is able to communicate with and manage one or more switches. For example, with reference to FIG. 1, the TMS unit included in the first server 105 can manage the switches 112, 114, 135, and 137. Through the TAPI unit 240A, 240B, 240C, the TMS unit 230A, 230B, 230C presents an application with a computer-telephony integration (CTI) view of these switches 112, 114, 135, and 137. This allows the application to manage the switches 112, 114, 135, and 137. Such switches 112, 114, 135, and 137 can operate without an associated TMS module 230A, 230B, 230C if CTI features are not being used

C. Application Unit Architecture

In the illustrated embodiment, the servers 105A, 105B, 105C each include one application unit—voice mail services (VMS) unit 250A, 250B, 250C, respectively. In general, the VMS unit 250A, 250B, 250C handles, distributes, and stores voice mail messages. The VMS unit 250A, 250B, 250C provides distributed access to voice mail; its functionality will be further described below with reference to FIG. 4. The VMS unit 250A, 250B, 250C is an application-layer communication that is capable of peer-to-peer interaction. As illustrated in FIG. 2, each of the servers 105A, 105B, 105C can exchange voice mail data via the VMS capability.

In one embodiment, VMS units 250A, 250B, 250C are implemented as dynamically linked library functions that are used by the TMS units 230A, 230B, 230C. That is, the VMS units 250A, 250B, 250C may use the same process space as the TMS units 230A, 230B, 230, respectively. Communication or data exchange between the TMS units 230A, 230B, 230C and the VMS units 250A, 250B, 250C is further described with reference to FIG. 3. Although VMS unit 250A, 250B, 250C is illustrated as executing on the server 105A, 105B, 105C, respectively, VMS unit 250A, 250B, 250C may be distributed among computing devices as is known to one of skill in the art. For example, the functionality enabled by VMS unit 250A, 250B, 250C may be implemented in a client-server fashion by having the client (user's local system) perform some functions and the server (VMS unit) perform others.

Figure 3:
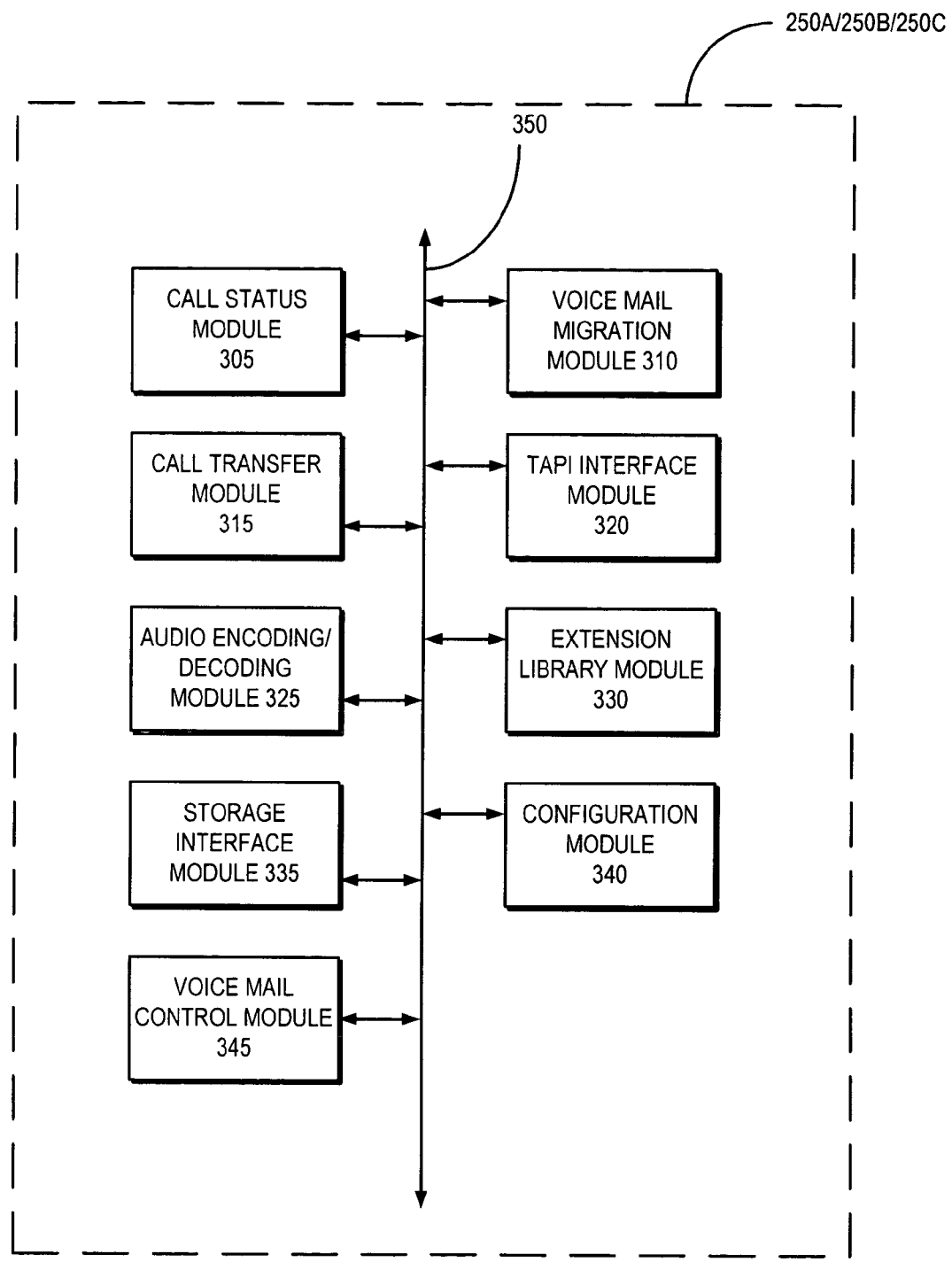
FIG. 3 is an illustration of one embodiment of the voice mail unit.

FIG. 3 is an illustration of one embodiment of the VMS unit 250A, 250B, 250C. Generally, VMS unit 250A, 250B, 250C includes several modules for receiving calls, transferring calls, saving voice mail messages, and forwarding voice mail messages to other servers. In the illustrated embodiment, the VMS unit 250A, 250B, 250C includes a call status module 305, a voice mail migration module 310, a call transfer module 315, a TAPI interface module 320, an audio encoding/decoding module 325, an extension library module 330, a storage interface module 335, a configuration module 340, and a voice mail control module 345. A data bus 350 communicatively couples each of the modules 305-345.

The modules 305-345 include program instructions that can be executed on, for example, processor 210A to implement the features or functions of the present invention. The modules 305-345 are typically stored in a memory, such as memory 220A. For the servers 105A, 105B, 105C, the program instructions can be distributed on a computer readable medium or storage volume. The computer readable storage volume can be available via a public network, a private network, or the Internet. Program instructions can be in any appropriate form, such as source code, object code, or scripting code.

The voice mail control module 345 centrally controls the operation and process flow of VMS unit 250A, 250B, 250C, transmitting instructions and data to as well as receiving data from each module 305-340. Details of its operation will be discussed below with reference to FIG. 4.

The call status module 305 determines whether a given call should be transferred to voice mail. In order to do this, the call status module 305 queries the TMS unit 230A through the TAPI interface module 320 and the TAPI unit 240A. This gives the call status module 305 access to the call on the switch itself. As previously described, the TAPI interface module 320 allows other modules to use the server's TAPI unit 240A.

The call transfer module 315 determines the desired voice mail extension and corresponding home server for each call. The call transfer module 315 also determines whether the home server is a remote server.

The storage interface module 335 allows other modules to store and retrieve data for later use. The audio encoding/decoding module 325 converts audio voice mail messages to a data format suitable for storage using the storage interface module 335. The audio encoding/decoding module 325 also converts voice mail messages from this storage data format to an audio format suitable for playing on a telephone.

The voice mail migration module 310 transfers voice mail messages to voice mail systems at remote servers. The configuration module 340 provides information about the distributed telephony system architecture, such as which servers exist, which servers are remote, etc. The configuration module 340 is used to determine how and where to send a voice mail message. Lastly, the extension library module 330 provides common functions that are used by the other modules.

D. Methods

Figure 4:
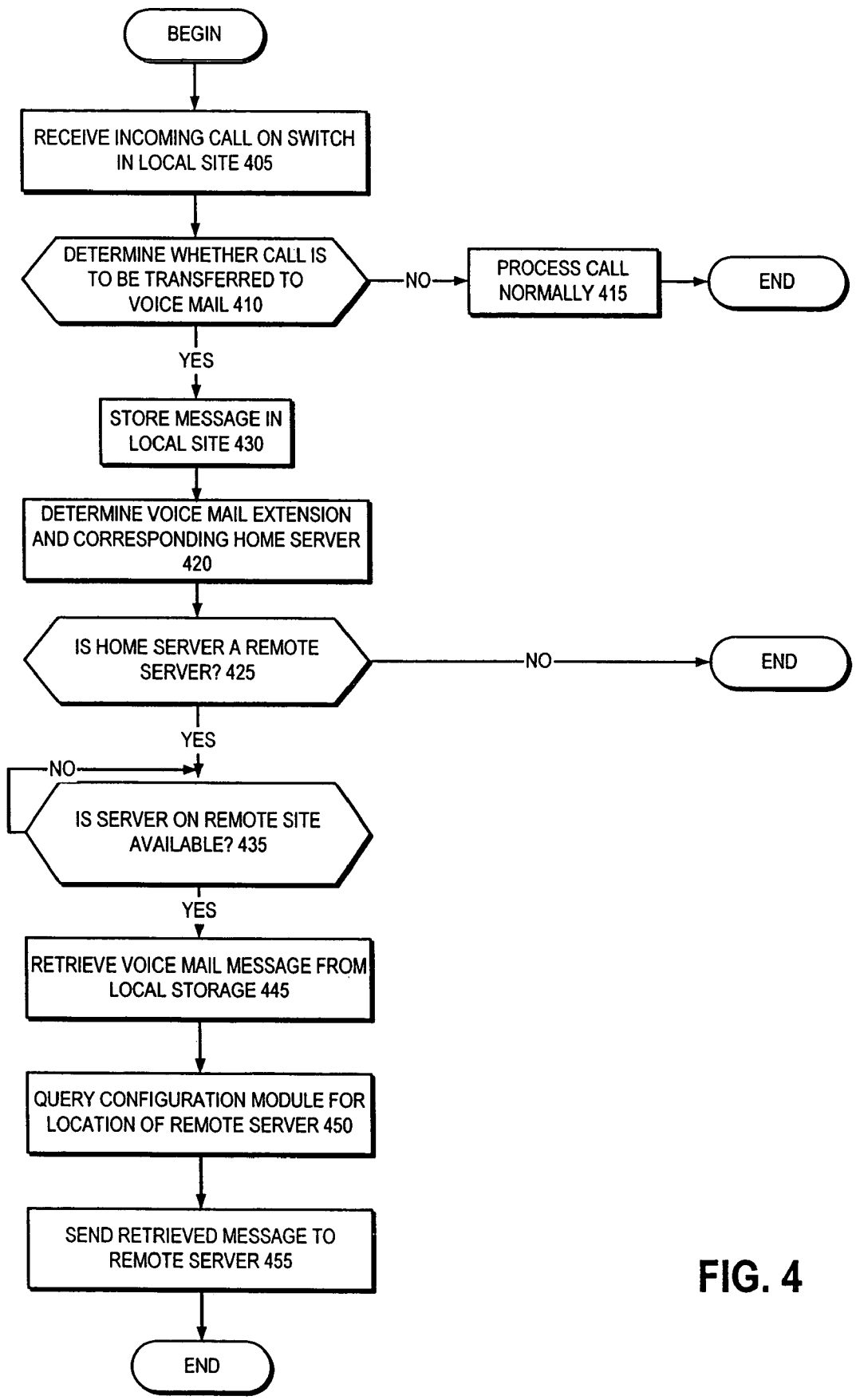
FIG. 4 illustrates a method for handling an incoming call, storing a voice mail message, and transferring a stored voice mail message to a remote server performed by a server according to one embodiment of the present invention.

Details of modules 305-345 will be further explained with reference to FIG. 4. FIG. 4 illustrates a method for handling an incoming call, storing a voice mail message, and transferring a stored voice mail message to a remote server performed by a server 105A according to one embodiment of the present invention. The method of FIG. 4 would be performed once for each call coming into a site. In one embodiment, different calls are handled in parallel.

First, an incoming call is received 405 on a switch in the local site. The voice mail control unit 345 then instructs the call status module 305 to determine 410 whether the call is to be transferred to voicemail. If the call is not to be transferred to voicemail, then the voice mail control unit 345 passes the call to the TMS unit 230A, and the TMS unit 230A processes 415 the call normally and the method ends.

If the call is to be transferred to voice mail, then the voice mail control module 345 stores 430 the voicemail message in the local server using the storage interface module 335 and the audio encoding/decoding module 325. The voice mail control module 345 then instructs the call transfer module 315 to determine 420 the call's desired voicemail extension and corresponding home server. The call transfer module 315 then determines 425 whether the home server is a remote server. If the home server is not a remote server, the method ends.

If the home server is a remote server, then the voice mail control module 345 determines 435 whether the remote server is available, for example, by using a network proxy. If the server on the remote site is not available, then the method returns to step 435. In other words, the voice mail control module 345 keeps checking whether the remote server is available until the remote server is available.

If the remote server is available, the voice mail control module 345 retrieves 445 the voice mail message from local storage using the storage interface module 335. The voice mail control module 345 then queries 450 the configuration module 340 for the location of the remote server. The voice mail control module 345 then instructs the voice mail migration module 310 to send 455 the retrieved voice mail message to the remote server and the method ends. The remote server later stores the message (not shown).

Having described embodiments of a server with backup capability for distributed IP telephony systems (which are intended to be illustrative and not limiting), it is noted that modifications and variations can be made by persons skilled in the art in light of the above teachings. It is therefore to be understood that changes may be made in the particular embodiments of the invention disclosed that are within the scope and spirit of the invention as defined by the appended claims and equivalents.

What is claimed is:

1. A method for receiving and storing voice mail messages, the method comprising:
   receiving, at a first server, an incoming call;
   determining whether the call is to be transferred to voice mail; and
   responsive to determining that the call is to be transferred to voice mail:
      determining the call's voice mail extension;
      determining a second server, the second server being the voice mail extension's home server;
      determining whether the second server is a remote server; and responsive to determining that the second server is a remote server:
　determining whether the second server is available; and
　responsive to determining that the second server is not available, storing the voice mail message in the first server.

2. The method of claim 1, further comprising:
responsive to determining that the call is not to be transferred to voice mail, handling the call normally.

3. The method of claim 1, further comprising:
responsive to determining that the second server is not a remote server, storing the voice mail message in the first server.

4. The method of claim 1, further comprising:
responsive to determining that the second server is available, sending the voice mail message to the second server.

* * * * *